US011820077B2

(12) United States Patent
Gomez Fernandez et al.

(10) Patent No.: US 11,820,077 B2
(45) Date of Patent: Nov. 21, 2023

(54) APPARATUS FOR LARGE SCALE ADDITIVE MANUFACTURING, AND A MATERIAL FOR MANUFACTURING

(71) Applicant: Singapore University of Technology and Design, Singapore (SG)

(72) Inventors: Javier Gomez Fernandez, Singapore (SG); Stylianos Dritsas, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 287 days.

(21) Appl. No.: 16/762,425

(22) PCT Filed: Nov. 12, 2018

(86) PCT No.: PCT/SG2018/050565
§ 371 (c)(1),
(2) Date: Aug. 6, 2020

(87) PCT Pub. No.: WO2019/093969
PCT Pub. Date: May 16, 2019

(65) Prior Publication Data
US 2021/0213680 A1 Jul. 15, 2021

(30) Foreign Application Priority Data
Nov. 10, 2017 (GR) .............................. 20170100506

(51) Int. Cl.
*B29C 64/20* (2017.01)
*B33Y 10/00* (2015.01)
(Continued)

(52) U.S. Cl.
CPC .............. *B29C 64/20* (2017.08); *B33Y 10/00* (2014.12); *B33Y 30/00* (2014.12); *B33Y 70/00* (2014.12);
(Continued)

(58) Field of Classification Search
CPC ......... B29C 64/20; B33Y 10/00; B33Y 70/10; C08L 5/08; C08L 89/06
See application file for complete search history.

(56) References Cited

U.S. PATENT DOCUMENTS 5,622,666 A 4/1997 Struszczyk et al.
5,939,192 A * 8/1999 Rettenbacher .......... C08L 97/02
428/401
(Continued)

FOREIGN PATENT DOCUMENTS

CN 105778159 A 7/2016
CN 105860464 A * 8/2016
(Continued)

OTHER PUBLICATIONS

International Search Report and Written Opinion issued in connection with corresponding International Application No. PCT/SG2018/050565 dated Feb. 7, 2019.

*Primary Examiner* — Joseph S Del Sole
*Assistant Examiner* — Mohamed K Ahmed Ali
(74) *Attorney, Agent, or Firm* — Potomac Law Group, PLLC; John J. Penny, Jr.

(57) ABSTRACT

The present invention discloses a system for large scale additive manufacturing, an apparatus for large scale additive manufacturing, and a bio-composite material used for the large scale additive manufacturing. The apparatus and the bio-composite material enable the system to operate in a desired manner. The system is able to facilitate "on demand" manufacturing, is able to provide regional/localised modifications for consumers, is able to minimise transportation/storage costs and also minimises damage to the environment.

11 Claims, 12 Drawing Sheets

(51) Int. Cl.
*B33Y 30/00* (2015.01)
*B33Y 70/10* (2020.01)
*B33Y 70/00* (2020.01)
*C08L 5/08* (2006.01)
*C08L 89/06* (2006.01)

(52) U.S. Cl.
CPC ................ *B33Y 70/10* (2020.01); *C08L 5/08* (2013.01); *C08L 89/06* (2013.01)

(56) References Cited

U.S. PATENT DOCUMENTS

2013/0287836 A1   10/2013   Ingber et al.
2019/0216988 A1*  7/2019    Kang ..................... B33Y 30/00

FOREIGN PATENT DOCUMENTS

| CN | 105860464 A | 8/2016 |
| CN | 106620875 A | 5/2017 |

\* cited by examiner

APPARATUS FOR LARGE SCALE ADDITIVE MANUFACTURING, AND A MATERIAL FOR MANUFACTURING

FIELD OF INVENTION

The present invention relates to an apparatus and method for additive manufacturing, and a material that can be used for additive manufacturing.

BACKGROUND

Continual advances have been made to increase the rate and scale of additive manufacturing, but advances in relation to sustainability have unfortunately been overlooked.

Currently, processes that achieve desirable rates and scalability typically employ thermoplastics (for example, ABS, PLA, PU Foam) which are not naturally compostable, cementitious materials with limited recyclability, or involve processes that require special chemical environments.

Generally, use of composites of natural materials with good mechanical properties can aid in the provision of sustainability benefits. However, the production of such composites of natural materials typically involve mixing with plastics and/or hazardous solvents, and to date, such production has been demonstrated only for smaller scale production volumes.

In addition, most bio-composite materials currently being employed in sustainable manufacturing are typically water-based. This provides unique challenges in relation to the manufacturing of the materials as their hardening through the removal of embodied moisture results in significant dimensional and structural changes.

Currently, the manufacture of large-scale objects using additive manufacturing requires control of the geometry of extruded material and of the geometry of layers that form the object. Achieving control at such manufacturing processes typically requires understanding of material behavior during the fabrication process and identifying suitable settings for key process parameters. In some instances, given the often soft nature of fabrication material, a geometry of a filament extruded on a surface can be highly subjective to controllable process parameters. Furthermore, the dimensions of printed layers change dynamically as layers are added above and due to shrinkage during drying phase.

Predictive models relating to geometry and physical properties of deposited filaments to process parameters have been experimentally developed for some additive manufacturing processes. Some examples include parametric fitting based on geometrical assumptions of filament profiles, non-parametric model fitting using complex algorithms and finite element modelling. Across these techniques, datasets are generated from large number of experimental runs with various combinations of process parameters values. Harvesting large amounts of data in this manner is both time and resource intensive.

It is evident that there are existing issues which need to be resolved. It should be noted that these issues also hamper the adoption of regional modular manufacturing which can involve use of large scale additive manufacturing processes. Regional modular manufacturing enables region-specific manufacturing and minimises logistical costs involving shipping and storage.

SUMMARY

In a first aspect, there is provided a method for fabricating an object, the method comprising:

providing a predetermined viscosity for a bio-composite mixture; and fabricating the object using the bio-composite mixture.

In an embodiment the bio-composite mixture employed in the present invention may be either a suspension or colloid, and that the fabrication of the object includes modification of characteristics of the bio-composite mixture, the characteristics being at least one of: mechanical, optical, and chemical characteristics. In another embodiment that the fabrication of the object comprises at least one process selected from: coating a mould surface, blow moulding, compression moulding, transfer moulding, injection moulding, extrusion, casting, and additive manufacturing.

In a second aspect, there is provided a mobile apparatus for large scale additive manufacturing comprising:

a spatial positioning component;

a material dispenser component controllable by the spatial positioning component;

a material supply component, the material supply component being coupled to the material dispenser component via a conduit; and a controller configured to enable interfacing between the spatial positioning component and the material supply component.

In a third aspect, there is provided a bio-composite material used for a plurality of manufacturing processes, the bio-composite material comprising a ratio of about 1:5 to about 1:12 of chitosan to cellulose, for instance, about 1.8 of chitosan to cellulose based on dry weight.

In a fourth aspect, there is provided a bio-composite mixture suitable for fabricating an object, the mixture comprising:

a first component of a carbohydrate disperse phase or a protein, and a second component of a cellulose based solid phase, the first and second components being in a predetermined ratio of about 1:5 to about 1:12, the ratio being based on dry weight or moles of the respective components, and chitin or chitosan being the carbohydrate in the first component and collagen being the protein.

In a final aspect, there is provided a computer implemented method for carrying out an additive manufacturing process using a bio-composite mixture to form an object, the method comprising:

providing a first CAD representation of the object;

determining deformation aspects during the manufacture of the object with use of modelling data;

providing a corrected CAD representation after determining the deformation aspects; and carrying out the additive manufacturing process in accordance with the corrected CAD representation.

It will be appreciated that the broad forms of the invention and their respective features can be used in conjunction, interchangeably and/or independently, and reference to separate broad forms is not intended to be limiting.

DESCRIPTION OF FIGURES

Non-limiting examples of the present invention will now be described with reference to the accompanying drawings, in which:

FIG. 13 is an image demonstrating how manufacturing deformations are dealt with;

DETAILED DESCRIPTION

Without wishing to be bound by any potential theory the present inventors have devised a bio-composite material which somewhat emulates the wall of fungi and oomycetes (ie, oomycete wall mimics) to produce a useable bio-composite material in which its components are present without substantial (or are devoid of) chemical modification. The material disclosed herein can therefore produce environmentally friendly products and avoid the use of strong organic solvents and hazardous pollutants such as acetone, carbon disulphide and sulfuric acid. In respect to the mimicry to oomycete walls the bio-composite materials described herein exhibit advantageous pliancy for extrusion manufacturing ease. The material also exhibits advantageous tensile strength for object manufacture and an acceptable level of shrinkage during manufacturing (fabricating)/processing.

In an embodiment the bio-composite mixture comprises a first component of a carbohydrate dispersed in an aqueous phase.

In an embodiment the bio-composite mixture comprises a first component of a protein dispersed in an aqueous phase.

In an embodiment the carbohydrate dispersed in an aqueous phase is chitin or chitosan.

In an embodiment the protein dispersed in an aqueous phase is collagen.

In an embodiment the aqueous phase is an acetic acid medium such as a 0.5-3% w/v aqueous solution of acidic acid, for instance a 1% w/v acetic acid solution. Other water soluble polar protic protein solvents could also be employed.

In a further embodiment the second component is a cellulose based solid phase.

In a further embodiment the first and second components are not modified, and in particularly not chemically modified prior to the production of the bio-composite mixture.

In an embodiment the ratio of first to second component is about 1:5 to about 1:12 such as 1:6 to 1:12, 1:7 to 1:12, 1:8 to 1:12, 1:9 to 1:12, 1:10 to 1:12; 1:11 to 1:12; 1:6 to 1:11, 1:6 to 1:10, 1:6 to 1:9, 1:6 to 1:8, 1:7 to 1:8, 1:7 to 1:9, and any ranges in between these values.

In an embodiment, the bio-composite mixture has a young modulus of about 0.05-1 GPa, such as 0.06, 0.07, 0.08, 0.09, 0.1, 0.15, 0.2, 0.25, 0.3, 0.35, 0.40, 0.45, 0.5, 0.55, 0.6, 0.65, 0.7, 0.75, 0.8, 0.85, 0.9 GPa or any range in between. In an embodiment the bio-composite mixture has a young modulus of about 0.2 GPa, such as about 0.1-0.3 GPa.

In an embodiment the bio-composite mixture has a density of about 0.6-0.2 gr/cm$^3$ such as 0.5, 0.45, 0.4, 0.35, 0.3, 0.25 or any range in between.

In an embodiment the bio-composite mixture has a density of about 0.37 gr/cm$^3$.

In an embodiment the bio-composite mixture has a young modulus of about 0.2 GPa and a density of about 0.37 gr/cm$^3$.

The present invention discloses a system for large scale additive manufacturing, an apparatus for large scale additive manufacturing, and a bio-composite material used for the large scale additive manufacturing. The apparatus and the bio-composite material enable the system to operate in a desired manner. The system is able to facilitate "on demand" manufacturing, is able to provide regional/localised modifications for consumers, is able to minimise transportation/storage costs and also minimises damage to the environment.

Figure 1:
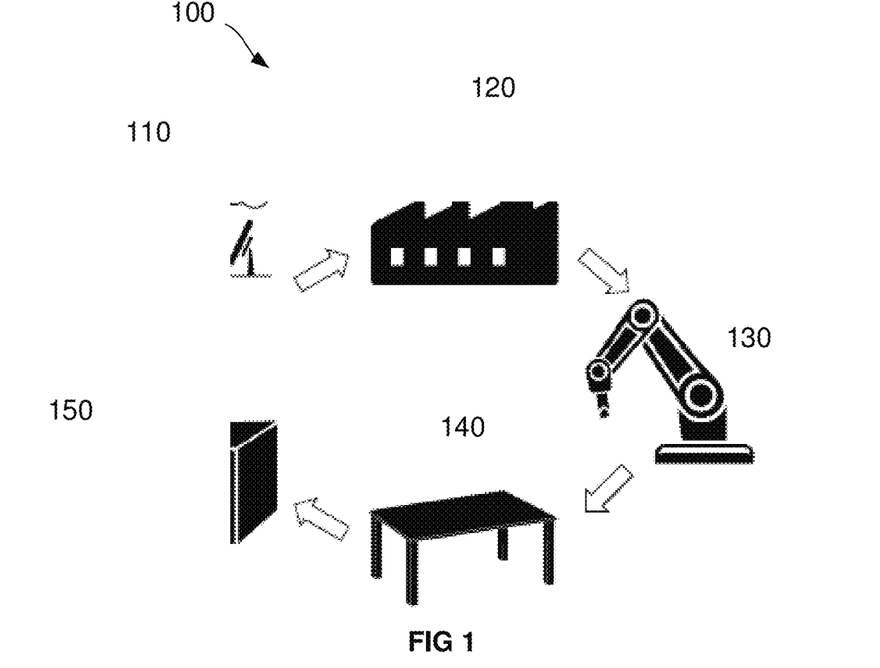
FIG. 1 is an example of a system for additive manufacturing.

Referring to FIG. 1, there is shown a system 100 for large scale additive manufacturing. The system 100 can be broadly described as follows. Typically, a user transmits an order for an object to be manufactured to a manufacturer 120 of the object using an ordering device like a computer 110. It should be noted that the order need not be transmitted directly to the manufacturer 120, and the order can be channelled via a retailer (not shown) of the object. Subsequently, the manufacturer 120 activates an apparatus 130 for additive manufacturing in order to manufacture the ordered object, whereby and in respect to the present invention the material being used for additive manufacturing is a bio-composite material. Further details of the apparatus 130 and the naturally occurring polymer will be provided in later sections of the description. A work product 140 of the apparatus 130 is the ordered object (in this example, a table) and the work product 140 is packaged prior to transmission to the user.

Figure 14:
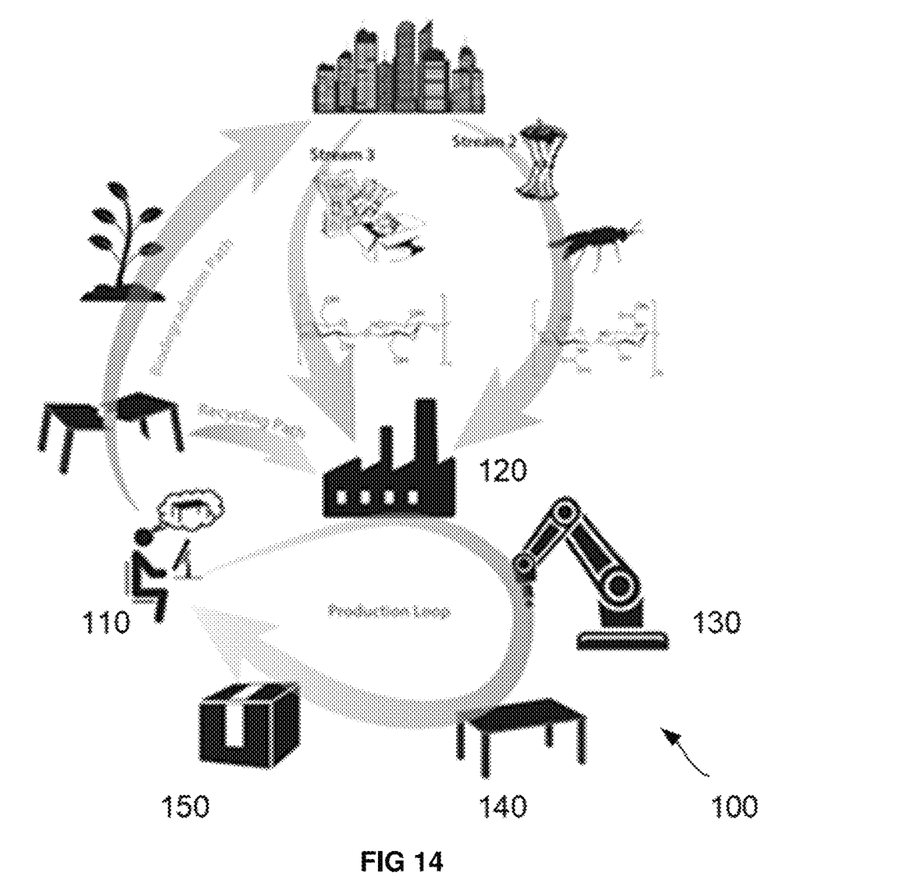
FIG. 14 provides further details of the system of FIG. 1.

As will be understood when the further details of the apparatus 130 and the bio-composite material are considered, it should be appreciated that the system 100 is able to facilitate "on demand" manufacturing, is able to provide regional/localised/bespoke modifications for consumers, is able to minimise transportation/storage costs and also minimises damage to the environment. With an understanding of the system 100, one will obtain a better appreciation of the apparatus 130 and the bio-composite material used herein. Referring to FIG. 14, there is shown how both naturally occurring, organic waste and recycled materials can be used in the system 100, and in particularly used for forming the bio-composite material described herein.

Figure 2:
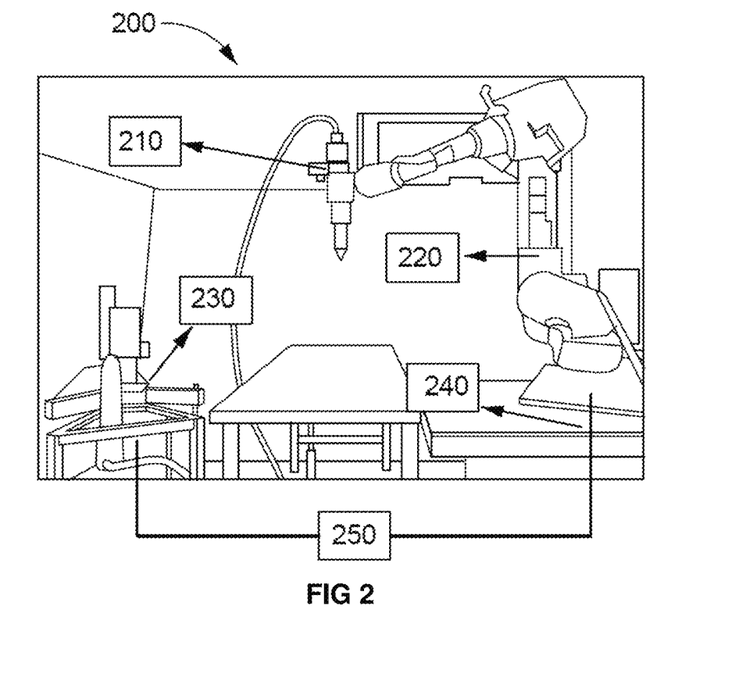
FIG. 2 is an example of an apparatus for carrying out additive manufacturing.

Referring to FIG. 2, there is shown an example 200 of the apparatus 130. The apparatus 200 comprises several integrated hardware and software components. A first component of the apparatus 200 is a spatial positioning component 220. The spatial positioning component 220 can be a multi-axis (for example, six) robot with, for example, a 20 kg payload and 1650 mm horizontal reach.

The apparatus 200 can be located on a ground, or mounted to a movable platform 240, such as, for example, a hydraulic scissor-lift mobile platform. The platform's 240 vertical travel, up to 1600 mm from the ground, allows for a combined maximum vertical reach of 3700 mm while horizontally, with some calibration effort after relocation, it can be expanded indefinitely. In some embodiments, only the spatial positioning component 220 is mounted to the movable platform 240.

The apparatus 200 also comprises a material supply component 230 and a material dispenser component 210. The material supply component 230 includes a pump with a reservoir of a pre-defined capacity. The pre-defined capacity of the reservoir can be, for example, 50 L. The material supply component 230 is configured to transport viscous materials without pulsation or shear artifacts.

The material dispenser component 210 can be mounted to the spatial positioning component 220 in a manner which allows movement of the material dispenser component 210 (for instance, the bio-composite material). By mounting the spatial positioning component 220 to the material dispenser component 210, this enables the material dispenser component 210 to move in a controllable manner by controlling the spatial positioning component 220. It should be noted that being able to move the material dispenser component 210 allows the apparatus 200 to carry out additive manufacturing. In addition, the material dispenser component 210 can be configured to deploy an auger screw cavity transport design which allows for precise flow control enabling drip and tail prevention. The material dispenser component 210 includes a nozzle where inner diameter can be, for example, a maximum of 12 mm, and flow rate can be, for example, 3.5 ml/s. For shaping operations, a PTFE coated nozzle jacket can be used, and for subtractive operations, a pneumatic die grinder mounted perpendicular to the nozzle can be employed.

Material (such as, the bio-composite material of the invention) can be transported from the material supply component 230 to the material dispenser component 210 via a stainless steel braided hose. The entire system is capable of transporting even highly viscous materials (for example, 80-2,000 Pa·s) and is rated for 2 MPa pressure.

The apparatus 200 also includes a controller 250 configured for controlling operations carried out by the apparatus 200, for example, the operations of the material supply component 230 and the spatial positioning component 220. It should be appreciated that the controller 250 can be connected either wirelessly or by a cabled connection to the material supply component 230 and the spatial positioning component 220. For example, integration between the material supply component 230 and the spatial positioning component 220, and the controller 250 is done using a programmable logic control. Typically, firmware design is kept to a minimum, primarily directed to digital-to-analog conversion for the material supply component 230 and digital switching. Control logic can be directed upstream on the design-to-production software based on modern programming paradigms. The digital fabrication library, within the Rhinoceros/Grasshopper parametric environment, can be used for kinematic simulation, machine code generation and bidirectional communications.

The apparatus 200 is able to carry out additive manufacturing for large-scale objects by controlling process settings to print filaments of desired dimensions while constraining the operating point to a region of maximum tensile strength and minimum shrinkage.

When using a cellulose-chitin bio-composite as the additive manufacturing material, for both 9 mm and 12 mm wide filaments, there exists a critical overlap distance (3.5 mm and 5 mm respectively) beyond which the strength of the bonded region is greater than that of a single filament. This indicates that despite the material's high viscosity, individual filaments can homogenize provided a threshold level of mixing is induced during deposition. This confirms the material's suitability for additive manufacturing where adjacent filaments of material need to be fused together to create objects. Typically, for filaments made of the cellulose-chitin bio-composite of width X, an overlap of 0.4X produces strong joints without delamination upon drying. Based on the preceding information, the linear scaling of shrinkage of overall width along with constant shrinkage in length and height of the repeating units can provide insights on developing pathing algorithms which predict and suitably compensate for shrinkage.

Figure 3A:
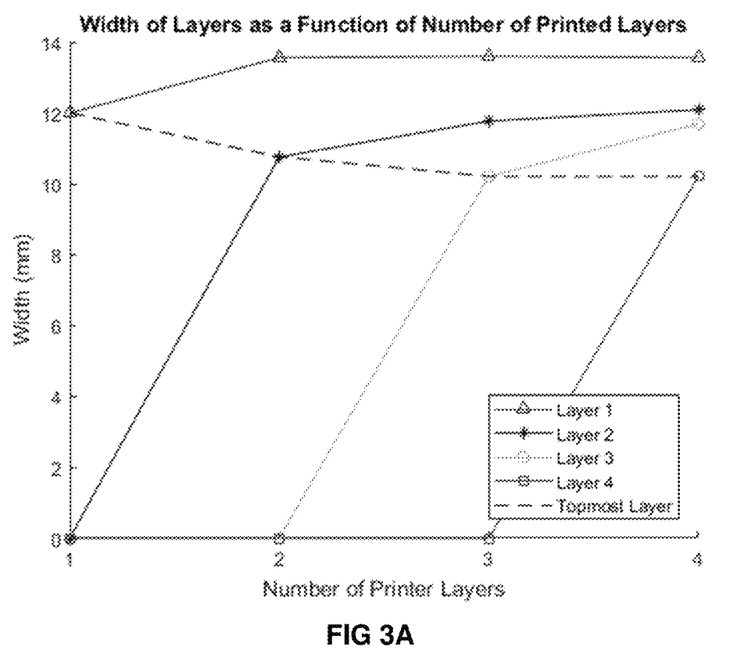
FIGS. 3A and 3B are graphs of shrinkage in width and height respectively.
Figure 3B:
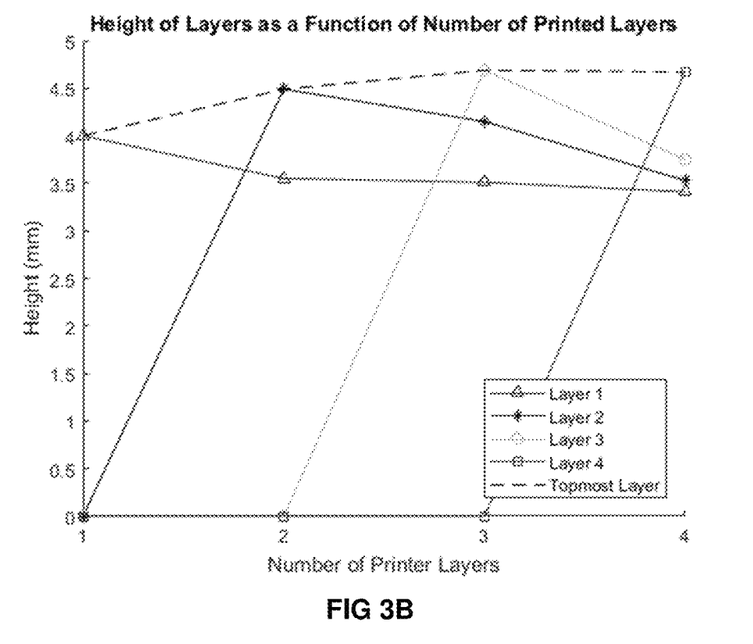
Figure 4A:
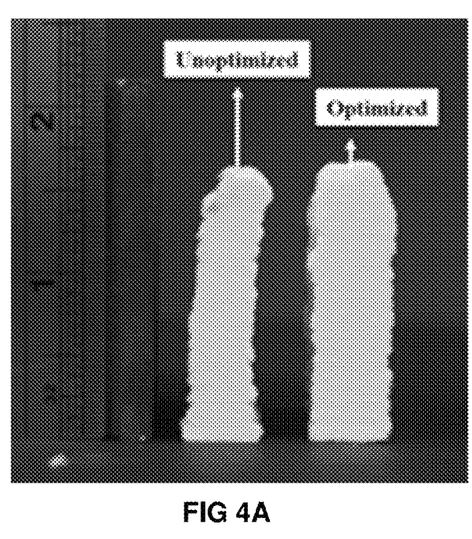
FIGS. 4A and 4B are images demonstrating improvement of contour levels.
Figure 4B:
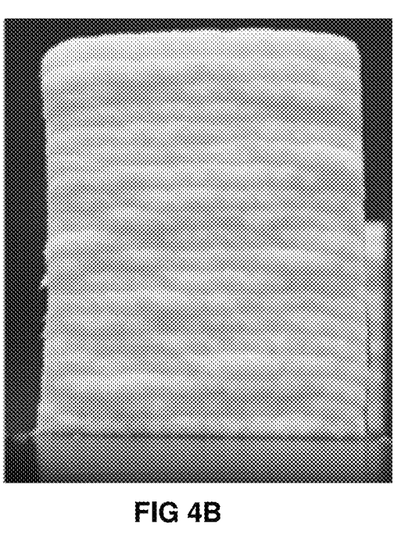

Referring to FIGS. 3A and 3B, there is shown some aspects of material behavior which enables alleviation of tapering and improvement of height accuracy. The typically bottom-up additive manufacturing method causes a dynamic change in the width and height of extruded filaments when the cellulose-chitin bio-composite is used. First, the material undergoes non-linear compression as the changes in dimensions do not scale linearly with applied loading. Instead, the widths and heights of filaments tend to saturate at certain values. This is suggestive of a localized zonal effect of loading. Therefore, the compression characteristics of a given layer is only significantly affected by a limited 'k' layers above it. Another insight is the saturation of substrate stiffness as indicated by plateauing measures of width and height of the topmost filament printed. This allows us to extend this 'k-neighbor' theory whereby the final dimensions of a given layer are only affected by 'k' layers above and below the given layer. Seeing how the height of layers saturates around 3 mm, the spacing between contours was modified from 4 mm to 3 mm with aims of improving overall accuracy of contour levels. A 19-layer wall, with toolpaths spaced 3 mm apart vertically, was printed with the same machine settings. Referring to FIG. 4A, the printed wall ("optimized") is significantly free of cross-sectional taper as compared to the un-optimized conditions ("unoptimized"). Furthermore, although the optimized wall contains 6 additional layers compared to the un-optimized wall, it exhibits greater stability given its uniform cross-sectional area. Referring to FIG. 4B, consistent layer height is also evident.

Figure 5:
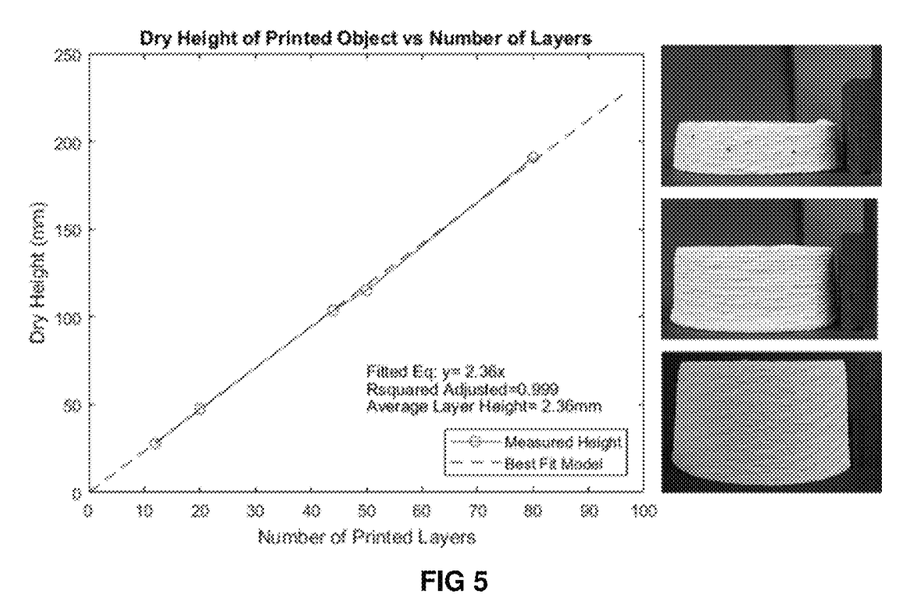
FIG. 5 is a graph of dry heights of printed cylinders as a function of a number of printed layers.

Referring to FIG. 5, there is shown a linear relationship between number of printed layers and final height of printed objects. Thus, shrinkage can be compensated by suitably adding more layers thereby producing more accurate prints.

Figure 6:
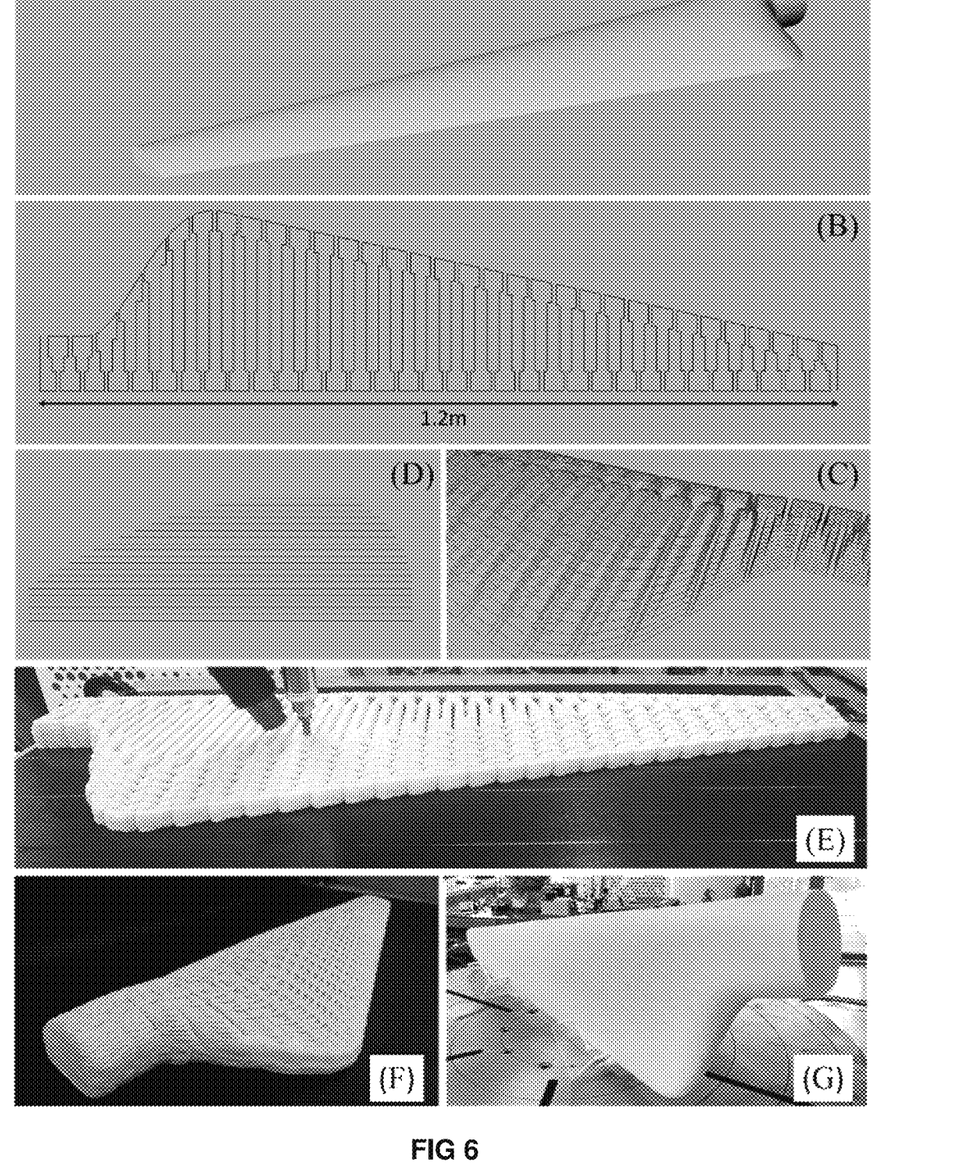
FIGS. 6A to 6G are images of an object manufactured using the apparatus of FIG. 2.

In view of the preceding information, a process was formulated to define toolpaths and print large-scale objects such as a 1.2 m long wind turbine blade as shown in FIG. 6. The blade has a NACA Symmetric Airfoil profile, was desired to be printed in two halves and glued together with the same material. A thin layer of the material is then plastered on the outer surface and smoothened through sanding operations.

The settings to print the blade were as obtained from the multi-objective optimization: $v\_R=49$ mm/s, $z\_N=3.98$ mm and $f\_M=2.43$ ml/s. These settings produce single filaments of width 12 mm and height 4 mm which were deemed suitable given the size of the object. The pathing algorithm was generated based on the findings provided in the preceding paragraphs. The object is first sliced into layers that are 3 mm apart vertically to prevent tapering of cross-section of layers. To fill space within each layer, a serpentine pathing strategy was implemented which is algorithmically generated based on the boundary profile of the layer [FIG. 6B]. The pattern consists of laterally overlapping units with voids in between, much like the square repeating patterns presented earlier. The length of the overlapping region and the overlap distance were set to 42 mm and 6 mm to ensure strong bonding between the units [FIG. 6C]. Five additional layers spaced apart by 3 mm each were added below the layer closest to the reader in FIG. 6D to compensate for shrinkage in height. Given that the material shrinks more along its width (12%) than its length (5%), the direction of print was set to be perpendicular to the length of the blade. This configuration better preserves the cross-sectional shape of the blade given the smaller percentage of shrinkage along the length of filaments.

Further information will now be provided for the bio-composite material used for the large scale additive manufacturing discussed in the preceding paragraphs. It should be appreciated that the bio-composite material can be used for other manufacturing processes like, for example, coating a mould surface, blow moulding, compression moulding, transfer moulding, injection moulding, extrusion, casting, additive manufacturing and so forth. The main components of the bio-composite material are cellulose and chitin which are abundant and readily available. The main components are also bio-degradable.

The interaction of chitinous polymers with cellulose produces composites of different characteristics depending of the content. Higher concentrations of chitosan typically lead to higher tensile strength, but shrinkage after solidification and viscosity of the mix become unfavorable for manufacturing due to increasing shrinkage due to solvent evaporation. A ratio of 1:5 to 1:12 chitosan to cellulose results in a composite with mechanical characteristics similar to those of typical natural and synthetic manufacturing materials, while the shrinkage ratio is at 2% after manufacture, which is in a similar range of typical commodity plastics (for example, 1% for Nylon 6, 4% High density polyethylene, 1.5% for Polypropylene). A preferred ratio of chitosan to cellulose can be 1:8.

Additionally, while protonated chitosan is soluble in water, the interaction of those groups with cellulose provides a composite with unexpectedly low water uptake. The bio-composite material provides a Young's modulus of 0.2 Gpa and a density of 0.43 g/cm$^3$. This matches the properties of high density polyurethane foam which is typically used for thermal and acoustic isolation in construction, and impact absorption in automobile industry.

Figure 7:
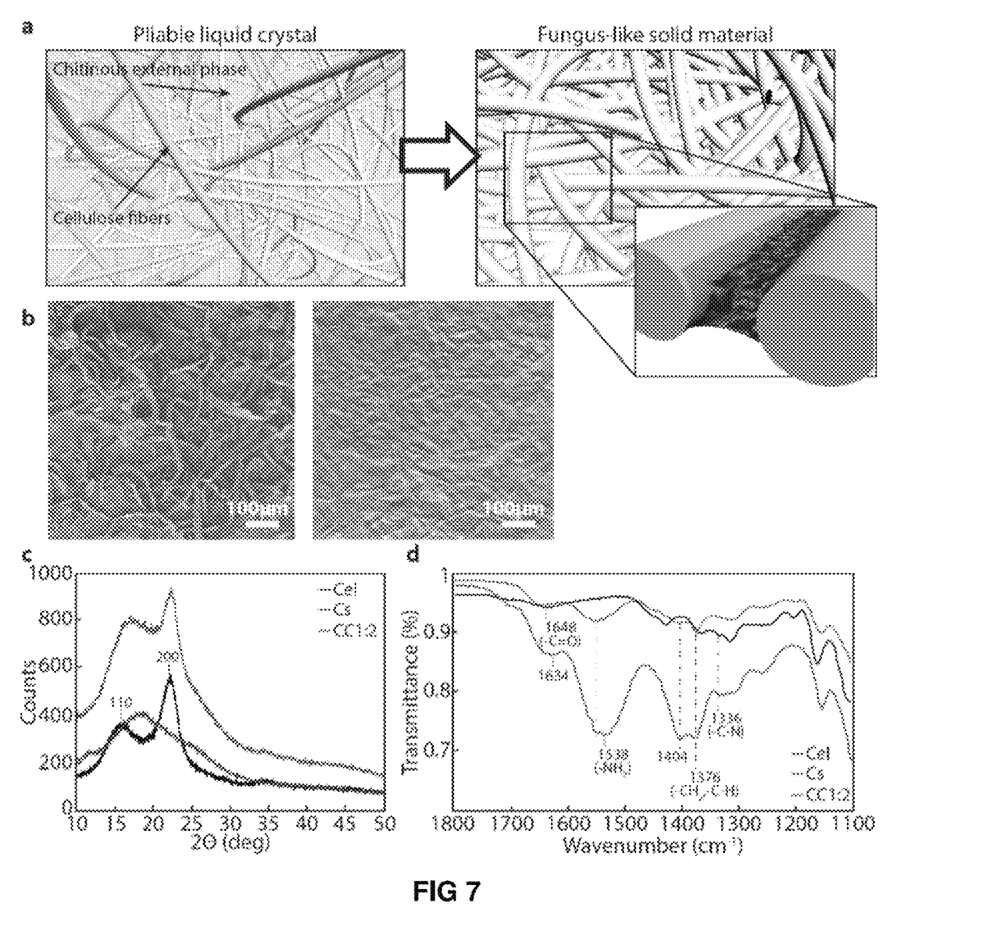
FIGS. 7A to 7D are various images of various aspects of a bio-composite material used in the apparatus of FIG. 2.

Referring to FIG. 7A, cellulose fibers are dispersed in a chitosan solution in a 1% acetic acid in water. After removal of the water, chitosan crystallizes in between the cellulose fibers. In the process some of the NH$_2$ groups in chitosan bond to form a crystal, while the rest are sterically available to react with the free hydroxyl groups on the surface of the cellulose fiber. As the chitosan loses intermolecular water, the polymer crystal reduces its volume, bonding the fibers into a solid composite. FIG. 7B shows electron images of the cellulose fibers (left) and their structure in the composite with a 10% chitosan concentration.

FIG. 7C shows a graph of X-ray diffraction pattern of the composite and their constituents. The data shows a cellulose polymorph that is not altered during the formation of the composite. A relaxation of the crystal structure, reflected in a shift of the 002 reflection, can be caused for the hydrogen bond of the cellulosic hydroxyl groups with chitosan, reducing the amount of cellulose-cellulose intermolecular hydrogen bonds.

FIG. 7D shows an FTIR fingerprint of the composite. The amino groups of the chitosan shifted from 1538 to 1556 cm$^{-1}$ and the band associated with the hydroxyl groups of the cellulose shifted from 1640 to 1648 cm$^{-1}$ indicates the interaction between amino groups of the chitosan and hydroxyl groups of the cellulose.

Figure 8:
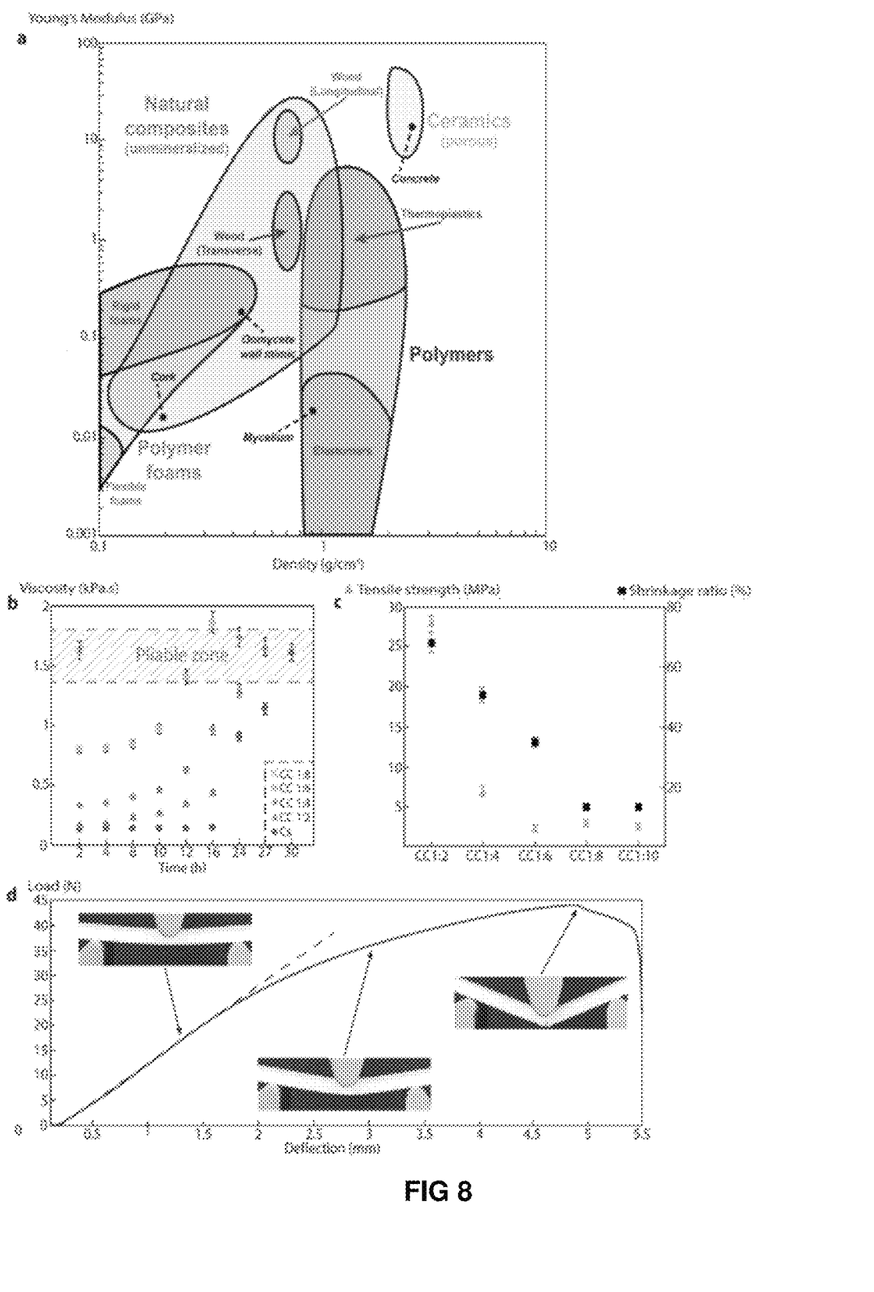
FIGS. 8A to 8D are various images of various mechanical characteristics of a bio-composite material used in the apparatus of FIG. 2.

FIG. 8A shows an Ashby plot showing the distribution of density and stiffness of natural and synthetic material commonly used in typical manufacturing processes. The specific region of interest for the bio-composite material is labelled as "oomycete wall mimic".

FIG. 8B shows a zone of pliancy whereby the bio-composite material can fall within. The zone of pliancy represents a range of viscosities suitable for manufacturing techniques, where the material can be extruded, can conform and can retain a shape.

FIG. 8C shows concentration levels which indicate a desirable balance between mechanical properties (tensile strength) and manufacturability (shrinkage).

FIG. 8D shows a three point fracture test to ensure that the bio-composite material can be used for multifunctional structures, balancing strength and stiffness. Ductile characteristics, load ratings and failure points can be determined correspondingly.

Figure 9:
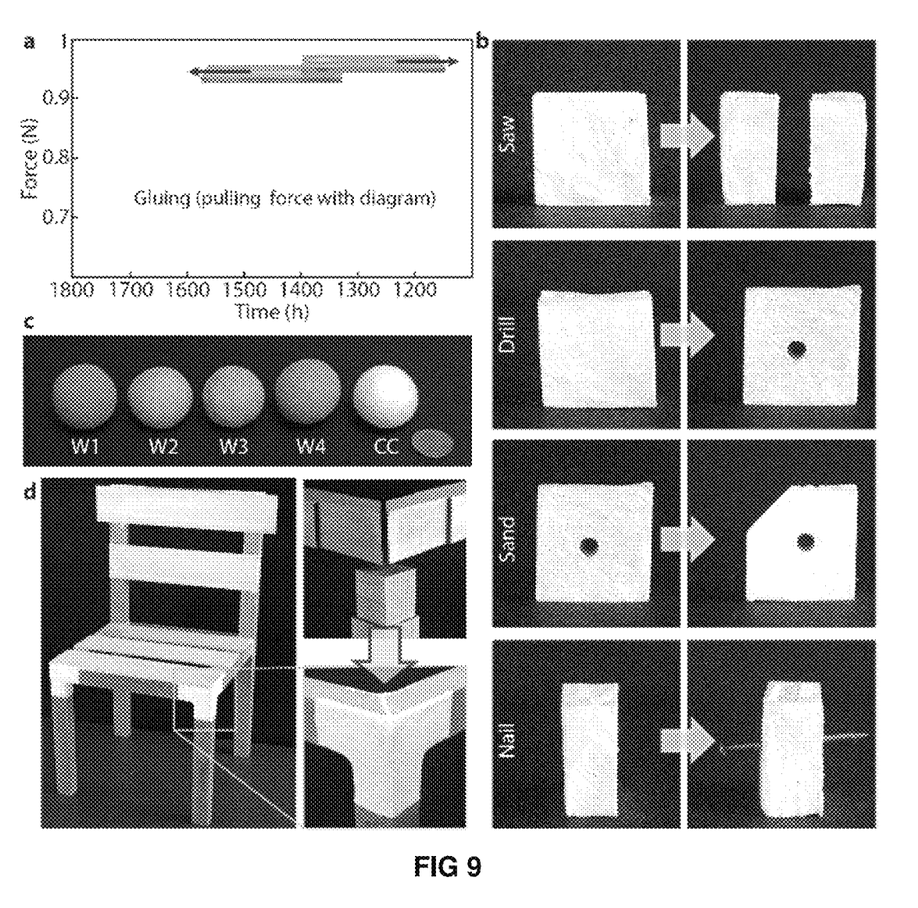
FIGS. 9A to 9D are various images of the bio-composite material being used in woodworking.

FIG. 9A shows a standard test of adhesion (ASTM XX) for the bio-composite material. Full adhesion strength is achieved after a certain number of time, and from that point 32 mg of dry bio-composite material covering an area of 9.3×9.3 mm holds the equivalent of 29.02±6.35 Kg. This ability of the material to attach to cellulosic composites (including itself) enables its use in additive manufacturing.

FIG. 9B shows the bio-composite material used in common woodworking techniques. The examples shown include a 4×4×4 cm cube of the material being sawn into two halves, one of the halves is being drilled and then sanded down to remove one of the corners, and a nail being hammered through the other half.

FIG. 9C shows composites being made with different sources of cellulosic materials. Samples W1 to W4 are made of wood byproduct of different qualities and sources, while the rightmost sphere ("CC") is made of pure cellulose.

Finally, FIG. 9D shows use of the bio-composite material in combination with pieces solid wood to produce a functional chair, as is necessary if the material is used in woodworking.

Typically, the apparatus 200 is able to carry out production of large objects using adaptive scaling. Further information is provided in this regard. The spatial positioning component 220 starts printing a part of the large object within its reach. In the course of the production process, the apparatus 200 is relocated to a new position, where it processes data of an environment and a position of the completed part of the large object.

Figure 10:
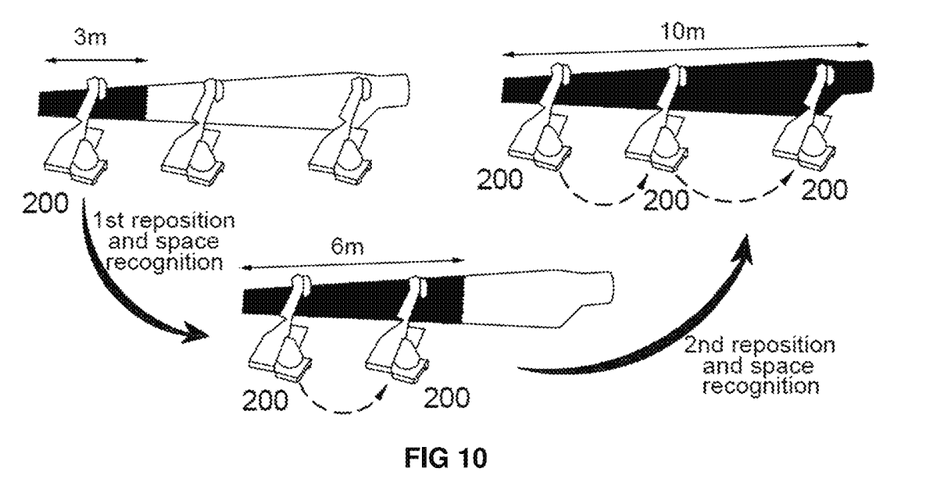
FIG. 10 is an image demonstrating movement of the apparatus of FIG. 2 during additive manufacturing of a large object.

After the apparatus 200 processes the data, it continues fabrication of another section of the large object within its new reach. This process is repeated until the fabrication of the large object is completed. It should be appreciated that the apparatus 200 does not require a complex (and expensive) subsystem for movement, enabling versatility of deployment and large object fabrication. This is shown in FIG. 10, where the apparatus 200 is readily moved from one position to the next.

Figure 11:
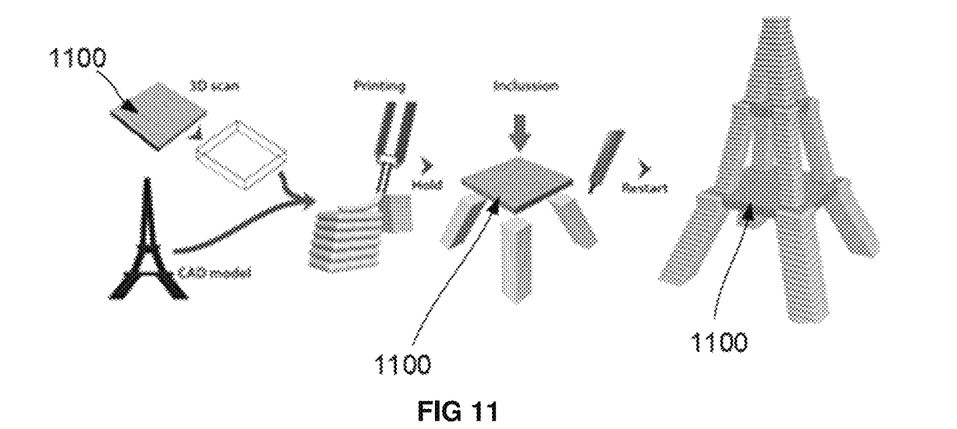
FIG. 11 is an image demonstrating a hydrid manufacturing process.

It should be noted that hybrid fabrication assembly using separate pieces combined with additive fabricated objects can also be carried out. For example, a solid piece of wood shaped in any configuration can be scanned and separately incorporated into a CAD design of an additive fabricated object. During such a hybrid fabrication assembly process, the apparatus 200 starts fabricating the object and once a desired position for locating the separate piece is defined, the separate piece is then integrated at the desired position. Once the separate piece is integrated at the desired position, the additive fabrication process is resumed. It should be noted that the separate piece should only be integrated if the integration of the separate piece does not hamper subsequent additive fabrication processes for other parts of the object being fabricated. Referring to FIG. 11, the "separate piece" is indicated by a discrete panel 1100 which is used in the object being formed. For example, the discrete panel 1100 can be used for the purpose of providing structural strength to the object being formed. In addition, the "separate piece" can also be incorporated in the object being formed for aesthetic purposes as well.

This approach overcomes limitations of a single technique, by hybridizing more than one technique in a process. This hybrid approach is possible because of the use of FLAM materials which enables the integration of any cellulosic components.

Figure 12:
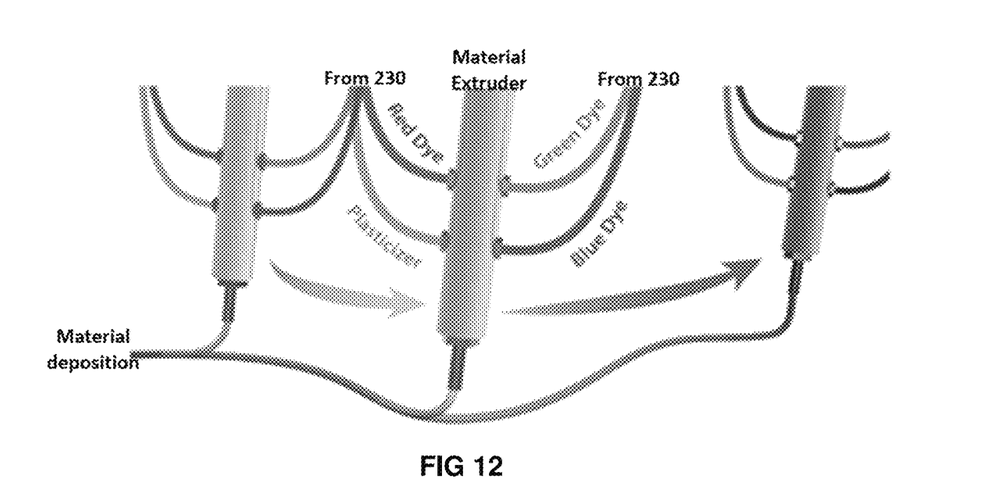
FIG. 12 is an image demonstrating an example of a method for modifying characteristics of a bio-composite material.

When using the apparatus 200, the bio-composite materials used can be modified to cause mechanical and optical changes. These changes can result from small alterations in their chemical structure. This flexibility can be used to dynamically vary characteristics of a printed FLAM object by the inclusion of dopants during a deposition process. For example, inclusion of colour using water soluble dyes, tuning of stiffness by the incorporation of glycerol to mediate in the intermolecular hydrogen bonds of cellulose and chitosan, and the like can be carried out. One way that the bio-composite material is modified is shown in FIG. 12. FIG. 12 shows colour dyes and plasticizers being added to the bio-composite material during a typical deposition process during additive manufacturing.

Figure 13A:
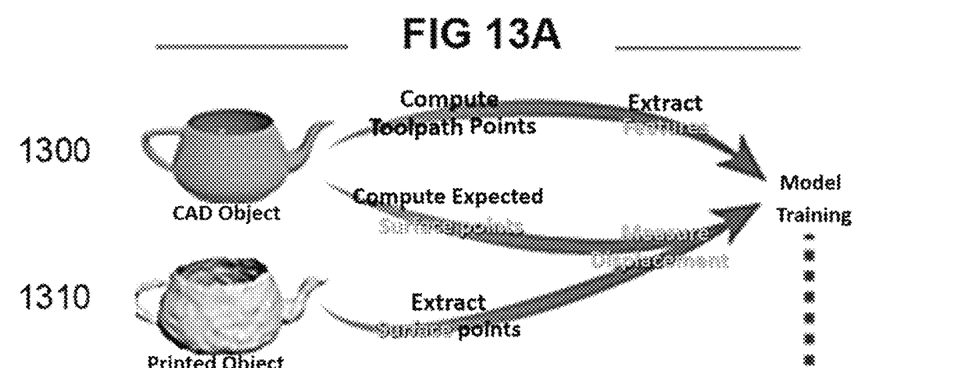

Moreover, during use of the bio-composite materials when using the apparatus 200, the bio-composite materials typically react to the environment in a non-linear (unpredictable) manner. This can result in substantial geometrical differences (deformation) of an object being additively fabricated if the non-linear behaviour is not catered for. This is shown in FIG. 13A, where a CAD object 1300 is fabricated to a deformed version 1310 of a desired end product when the non-linear behaviour is not catered for.

As discussed in earlier portions, regression models are suitable for prediction of such non-linear behaviour in a small data set, such that the geometrical deformations can be forecast. Subsequently, extrapolation processes can be applied to any geometry given the right amount of training sets. A model based on image recognition and machine learning can be trained to compare CAD files with toolpaths inputted for the spatial positioning component 220 (expected outcome) with the actual printing (real outcome). The model can be trained with consideration of, for example, toolpath points, surface contour points, computed surface contour points, and the like.

Figure 13B:
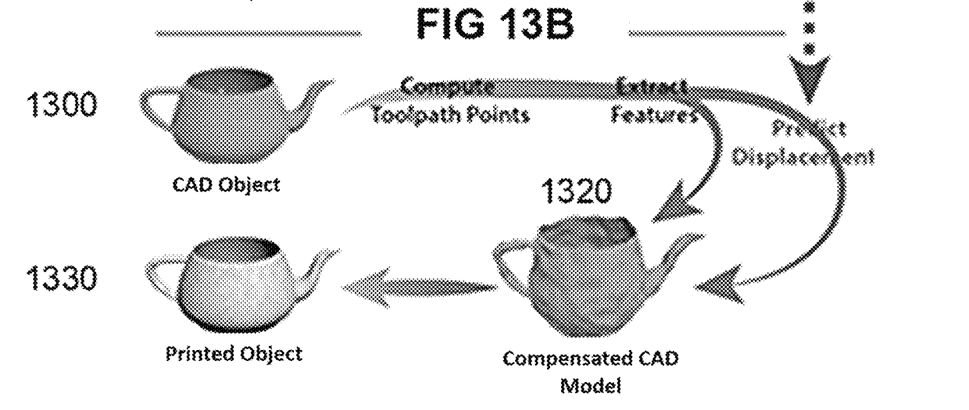

Once the model is trained to predict the geometrical deformations (FIG. 13A), the model can be adapted for use in a converse manner—when provided a desired geometry, the model provides a forecast of non-linear deformations for the desired geometry so that the fabricated object is formed with corrections of the non-linear deformations (FIG. 13B). This is shown in FIG. 13B, whereby a final product 1330 is fabricated from a compensated CAD model 1320. The compensated CAD model 1320 is generated by the trained model, such that the final product 1330 is substantially similar to the CAD object 1300.

Figure 15:
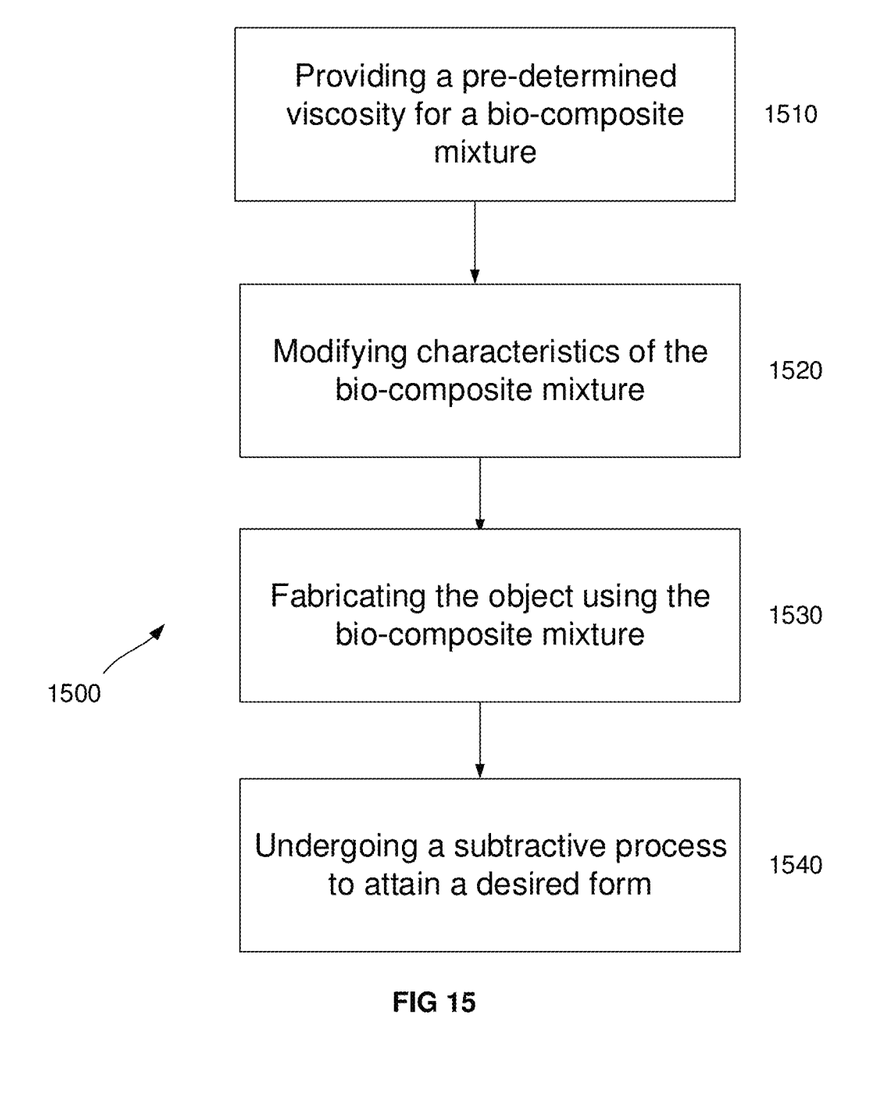
FIG. 15 is an example of a method for fabricating an object.

Referring to FIG. 15, there is also provided a method 1500 for fabricating an object, the object being a completely formed item or a part of the completely formed item. The method comprises providing a predetermined viscosity for a bio-composite mixture 1510, and fabricating the object using the bio-composite mixture 1530. The mixture can be either a suspension or colloid, and the fabrication of the object can include modification of characteristics of the bio-composite mixture 1520, the characteristics being at least one of: mechanical, optical, and chemical characteristics.

In some embodiments, the fabrication of the object comprises at least one process selected from: coating a mould surface, blow moulding, compression moulding, transfer moulding, injection moulding, extrusion, casting, additive manufacturing and so forth.

The bio-composite mixture can comprise a first component of a carbohydrate disperse phase, and a second component of a cellulose based solid phase. The first component can also be a protein. The first and second components can be in a predetermined ratio of 1:5 to 1:12, the ratio being based on dry weight or moles of the respective components, and chitin or chitosan being a naturally occurring carbohydrate in the first component. The cellulose based solid phase can be selected from for example, pure cellulose, wood flour, saw dust, paper, wood, timber, cotton, cellulosic composites and so forth.

Modifying characteristics of the bio-composite mixture can also include adding additives to the bio-composite mixture, the additives being selected from, for example, plasticizers, colorants, cross-linkers, small molecules, polymers, organic compounds, inorganic compounds, carbon nanotubes, fibrous materials and composites, biological compounds, biologically active compounds, compounds having biological activity, a biological agent, a pharmaceutical agent, a therapeutic agent, any combination of the aforementioned and so forth.

In some embodiments, the method 1500 includes the fabricated object undergoing a subtractive process to reach a desired form 1540. The subtractive process can include, for example, cutting, drilling, sawing, sanding down, carving and any combination of the aforementioned.

Figure 16:
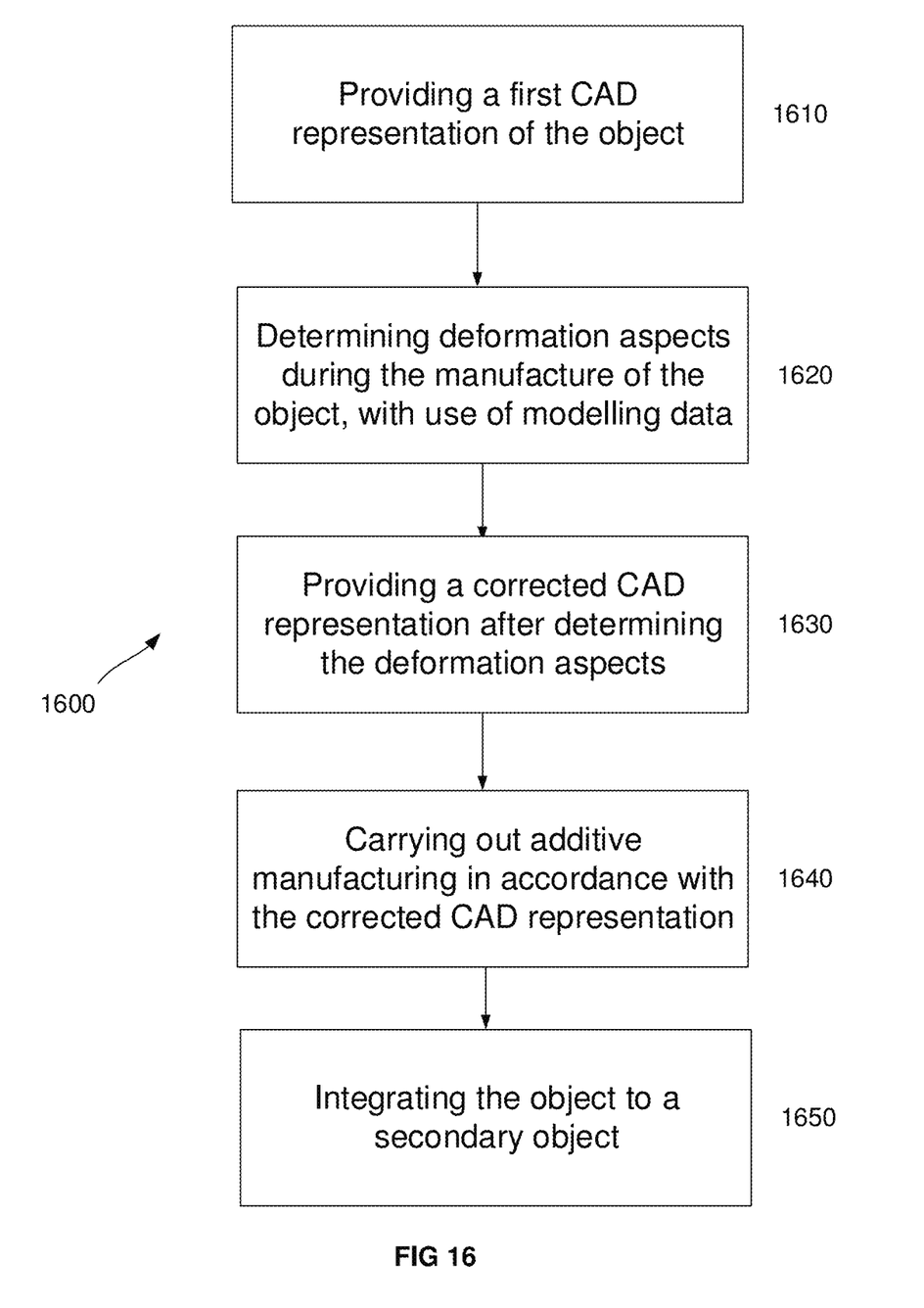
FIG. 16 is an example of a computer implemented method for fabricating an object.

There is also provided a computer implemented method 1600 for carrying out an additive manufacturing process using a bio-composite mixture to form an object. The method 1600 has been partially demonstrated in FIG. 13, and the method 1600 is one way of carrying out what is depicted in FIG. 13. It should be appreciated that the method 1600 can be carried out by the apparatus 200 or a combination of appropriate devices.

The method 1600 comprises providing a first CAD representation of the object 1610. Typically, the first CAD representation is a desired form of the object to be manufactured. The first CAD representation can be obtained from a 3D scan of an object or it can be defined manually.

Subsequently, the method 1600 comprises determining deformation aspects during the formation of the object with use of modelling data 1620. The modelling data used is obtained as per the earlier description pursuant to FIG. 13. It should be noted that the deformation aspects are caused at least by changes in a solvent content of the bio-composite mixture. The solvent used can be water.

Next, the method 1600 includes providing a corrected CAD representation after determining the deformation aspects 1630. Typically, the corrected CAD representation appears flawed compared to the first CAD representation. Finally, the method 1600 includes carrying out the additive manufacturing process in accordance with the corrected CAD representation 1640, whereby the final work product will appear more similar to the first CAD representation than the corrected CAD representation. In some embodiments, the method 1600 can include integrating the final work product to a secondary object 1650, whereby the secondary product can be a portion of a bigger item. When the step 1650 is included, a duration for carrying out the method 1600 can be extended to enable the integration of the final work product to the secondary object.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method for additive fabrication of an object, the method comprising:
    providing a paste-like bio-composite mixture with a viscosity of about 80 to about 2,000 Pa·s; and
    fabricating the object using the paste-like bio-composite mixture,
    wherein the paste-like bio-composite mixture is either a suspension or colloid, and wherein the fabrication of the object includes modification of characteristics of the paste-like bio-composite mixture, the characteristics being at least one of: mechanical, optical, and chemical characteristics, and wherein the fabrication of the object comprises at least one process selected from: coating a mould surface, blow moulding, compression moulding, transfer moulding, injection moulding, extrusion, casting, and additive manufacturing;
wherein the paste-like bio-composite mixture comprises:
    a first component comprising a carbohydrate or a protein in an aqueous phase, and
    a second component comprising a cellulose in the aqueous phase,
    the first and second components are in a ratio of about 1:5 to about 1:12, the ratio being based on dry weight or moles of the respective components,
    wherein the carbohydrate in the first component is chitin or chitosan;
    wherein the protein in the first component is collagen; and
    wherein the paste-like bio-composite mixture is void of thermoplastics.

2. The method of claim 1, wherein the first and second components are in a ratio of about 1:8.

3. The method of claim 1, wherein the cellulose is selected from a group consisting of pure cellulose, wood flour, saw dust, paper, wood, timber, cotton and cellulosic composites.

4. The method of claim 1, wherein modification of characteristics of the paste-like bio-composite mixture comprises adding additives to the paste-like bio-composite mixture, the additives being selected from a group consisting of plasticizers, colorants, cross-linkers, small molecules, polymers, organic compounds, inorganic compounds, carbon nanotubes, fibrous materials and composites, biological compounds, biologically active compounds, compounds having biological activity, a biological agent, a pharmaceutical agent, a therapeutic agent, and any combination of the aforementioned.

5. The method of claim 1, further comprising the object undergoing a subtractive process to reach a desired form, the subtractive process being at least one process selected from a group consisting of cutting, drilling, sawing, sanding down, carving and any combination of the aforementioned.

6. The method of claim 1, wherein modification of characteristics of the paste-like bio-composite mixture comprises adding additives to the paste-like bio-composite mixture, the additives being selected from a water soluble dye and/or glycerol.

7. The method of claim 1, wherein when used in additive manufacturing, the paste-like bio-composite mixture is extruded as filaments, wherein adjacent filaments overlap of each other by more than about 0.4 times of its filament width.

8. The method of claim 1, wherein when used as additive manufacturing, the paste-like bio-composite mixture is extruded as filaments having a width of about 3 mm to about 4 mm.

9. The method of claim 1, wherein hydrogen bonds are formable between amino groups of the carbohydrate or the protein and hydroxyl groups of the cellulose.

10. The method of claim 1, further comprising a step of attaching the object to a cellulosic material.

11. The method of claim 1, wherein the carbohydrate or protein is crystallisable between cellulose fibers.

* * * * *